United States Patent
Bex et al.

(10) Patent No.: US 9,604,597 B2
(45) Date of Patent: Mar. 28, 2017

(54) WIPING DEVICE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 14/130,307

(22) PCT Filed: May 21, 2012

(86) PCT No.: PCT/EP2012/059368
§ 371 (c)(1),
(2), (4) Date: Dec. 30, 2013

(87) PCT Pub. No.: WO2013/000627
PCT Pub. Date: Jan. 3, 2013

(65) Prior Publication Data
US 2014/0130281 A1    May 15, 2014

(30) Foreign Application Priority Data
Jun. 28, 2011   (DE) .................. 10 2011 078 175

(51) Int. Cl.
*B60S 1/38*   (2006.01)
*B60S 1/40*   (2006.01)
*B60S 1/18*   (2006.01)

(52) U.S. Cl.
CPC .............. *B60S 1/18* (2013.01); *B60S 1/3851* (2013.01); *B60S 1/3881* (2013.01); *B60S 1/381* (2013.01); *B60S 1/386* (2013.01); *B60S 1/3856* (2013.01); *B60S 1/3875* (2013.01)

(58) Field of Classification Search
CPC .... B60S 1/3881; B60S 1/3851; B60S 1/3849; B60S 1/3856; B60S 1/381; B60S 1/3853; B60S 1/3858
USPC .................. 15/250.32, 250.43, 250.201
See application file for complete search history.

(56) References Cited

U.S. PATENT DOCUMENTS

| 3,881,214 A * | 5/1975 | Palu ............... B60S 1/3806 15/250.48 |
| 4,807,326 A * | 2/1989 | Arai ................. B60S 1/38 15/250.43 |
| 6,799,348 B1 * | 10/2004 | Swanepoel .......... B60S 1/38 15/250.32 |
| 7,203,990 B2 | 4/2007 | Mayer |
| 7,350,259 B2 * | 4/2008 | Walworth ........ B60S 1/3856 15/250.201 |
| 7,587,783 B1 * | 9/2009 | Lin ............... B60S 1/3858 15/250.201 |
| 2005/0172443 A1 * | 8/2005 | Genet ............... B60S 1/381 15/250.201 |

(Continued)

FOREIGN PATENT DOCUMENTS

DE   102005062463   6/2007
DE   102008001045   10/2009

(Continued)

*Primary Examiner* — Gary Graham
(74) *Attorney, Agent, or Firm* — Michael Best & Friedrich LLP

(57) ABSTRACT

The invention relates to a wiping device, in particular a wiping device for a motor vehicle pane, comprising a wiper blade adapter (12a; 12b). According to the invention, the wiper blade adapter (12a; 12b) comprises a pivot bearing (26a; 26b) that is designed to pivotally mount a spring element (20a; 20b).

13 Claims, 3 Drawing Sheets

(56) References Cited

U.S. PATENT DOCUMENTS

| | | | |
|---|---|---|---|
| 2006/0037167 A1* | 2/2006 | Nacamuli | B60S 1/38 15/250.201 |
| 2008/0295273 A1* | 12/2008 | Lin | B60S 1/381 15/250.452 |
| 2009/0178226 A1* | 7/2009 | Lee | B60S 1/381 15/250.32 |

FOREIGN PATENT DOCUMENTS

| | | |
|---|---|---|
| DE | 102008041358 | 2/2010 |
| DE | 102009029458 | 3/2011 |
| EP | 2177406 | 4/2010 |
| WO | 0021810 | 4/2000 |

\* cited by examiner

WIPING DEVICE

BACKGROUND OF THE INVENTION

A wiper device, particularly a motor vehicle windscreen wiper device, having a wiper blade adapter is already known in the art.

SUMMARY OF THE INVENTION

The invention is based on a wiper device, particularly a motor vehicle windscreen wiper device, having a wiper blade adapter.

It is proposed that the wiper blade adapter comprises a pivot bearing which is provided to pivotably support a spring element, as a result of which the spring element can be particularly flexibly configured and a contact pressure on a surface to be wiped can be distributed particularly evenly. A "wiper blade adapter" in this context should be particularly understood to mean an adapter which exhibits a contact area to a wiper blade component and is connected to the wiper blade component in an undetachable manner and is provided to supply a connection area of the wiper blade component for a connection and/or contact with a wiper arm adapter. A "pivot bearing" in this context should be particularly understood to mean a bearing which is provided to connect two components to one another, so as to allow a pivoting movement about a pivot axis. A "spring element" in this context should be particularly understood to mean a resilient element which comprises at least one extension, said extension being elastically variable in a normal operating state by at least 10%, particularly by at least 20%, preferably by at least 30%, and particularly advantageously by at least 50%, and which particularly generates a counterforce which depends on a change in the extension and is preferably proportionate to the change, said counterforce acting against the change. "Pivotable" in this context should be particularly understood to mean deflectable within a large part of the wiper blade adapter. A "large part" in this context should be particularly understood to mean more than 50%. "Deflectable" in this context should be particularly understood to mean movable to one another. "Provided" should be particularly understood to mean specially designed and/or equipped.

In a further embodiment of the invention, it is proposed that the pivot bearing has at least one punctiform and/or linear bearing surface, which is provided to support the spring element in a mounted state. "Punctiform and/or linear" in this context should be particularly understood to mean less than 10%, preferably less than 5%, particularly preferably less than 1%, of a total longitudinal extension of the wiper blade adapter, at least viewed in a longitudinal direction of the wiper blade adapter. A "bearing surface" in this context should be particularly understood to mean a surface at which a spring element in a mounted state at a particular point in time bears against the wiper blade adapter. A "longitudinal direction" in this context should be particularly understood to mean a direction which extends substantially parallel to a longitudinal extension of the wiper blade adapter. A "longitudinal extension" in this context should be particularly understood to mean a largest possible extension. "Substantially" in this context should be particularly understood to mean a deviation of less than 10°, preferably less than 5°. An "extension" of an element in this context should be particularly understood to mean a maximum distance between two points on a perpendicular projection of the element on a plane.

It is further proposed that the wiper blade adapter comprises at least one free space which is provided to space the spring element at least over a large part of a longitudinal extension of the wiper blade adapter from said wiper blade adapter in a vertical direction, by virtue of which a deflection of the spring element can be achieved particularly simply.

Furthermore, it is proposed that the at least one bearing surface is arranged centrally in the wiper blade adapter, viewed in a longitudinal direction. "Centrally" in this context should be particularly understood to mean an area which is arranged in between 45% and 55% of the total longitudinal extension.

If the pivot bearing exhibits at least a first and a second punctiform and/or linear bearing surface, which is provided to support the spring element in a mounted state, a particularly rigid connection between the wiper blade adapter and the spring element can be achieved.

In a further embodiment of the invention it is proposed that the wiper device exhibits a retaining element, which is provided to connect the spring element to a wiper strip and to a wind deflector element in a mounted state. A "retaining element" in this context should be particularly understood to mean an element which is provided to connect a wind deflector element, a spring element and a wiper strip in an interlocking manner. A "wiper strip" in this context should be particularly understood to mean a strip which is provided to wipe a vehicle windscreen. A "wind deflector element" in this context should be particularly understood to mean an element which is provided to deflect a headwind acting on the wiper device and/or to use it to press a wiper strip against a vehicle windscreen.

A particularly rigid connection can be achieved between the retaining element and the wiper blade adapter when the retaining element has at least one fastening recess, which is provided to receive the wiper blade adapter in an interlocking manner in a mounted state. A "fastening recess" in this context should be particularly understood to mean a recess which is provided to receive a corresponding fastening element.

BRIEF DESCRIPTION OF THE DRAWINGS

Further advantages emerge from the following drawing description. Two exemplary embodiments of the invention are depicted in the drawing. The drawings, description and claims contain a plurality of combined features. The person skilled in the art will advantageously observe the features individually too and bring them together to create further appropriate combinations.

In the figures.

DETAILED DESCRIPTION

Figure 1:
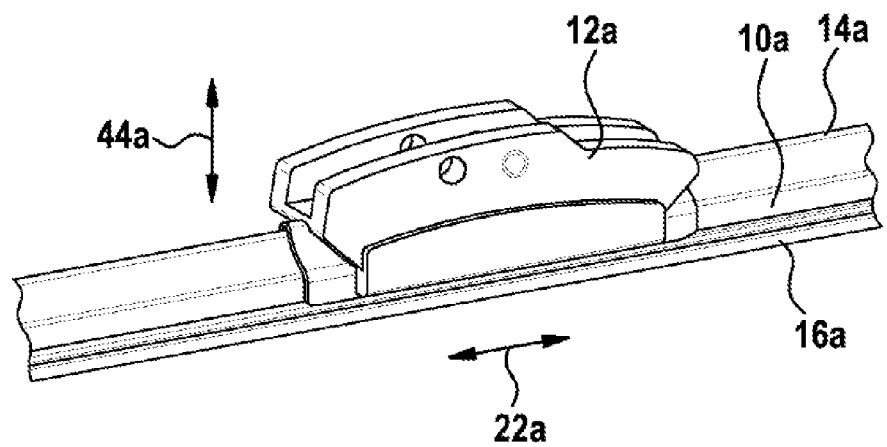
FIG. 1 shows a perspective view of a wiper device according to the invention with a wiper blade adapter and a retaining element.

FIG. 1 shows a perspective view of a wiper device according to the invention with a retaining element 10a, a wiper blade adapter 12a, a wind deflector element 14a and a wiper strip 16a in a mounted state. The wiper blade adapter 12a, the wind deflector element 14a and the wiper strip 16a are fastened to the retaining element 10a. The wiper blade adapter 12a is provided to be connected to a wiper arm (not shown). In an operating state, i.e. when the wiper arm executes a wiper movement, the wiper strip 16a is moved via the retaining element 10a over a surface to be wiped (not shown). When a headwind is encountered, the wind deflector element 14a deflects this and presses the wiper device onto the surface to be wiped.

Figure 2:
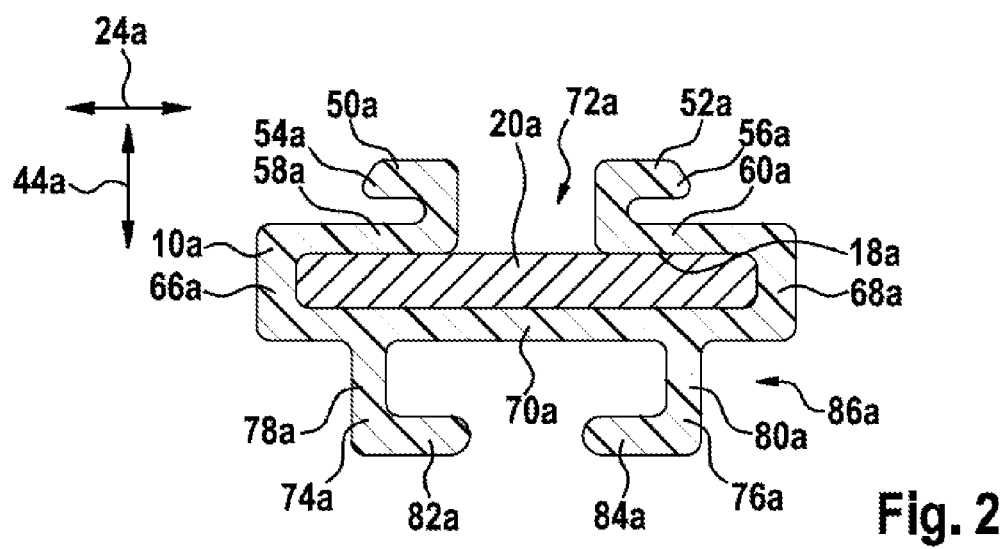
FIG. 2 shows a sectional view of the retaining element according to FIG. 1.

FIG. 2 shows the retaining element 10a, which comprises a longitudinal guide channel 18a to guide a spring element 20a, as a sectional view. The sectional plane runs perpendicularly to a longitudinal direction 22a of the retaining element 10a. The retaining element 10a has two wind deflector fastening elements 50a, 52a. The wind deflector fastening elements 50a, 52a are formed integrally with the retaining element 10a. The wind deflector fastening elements 50a, 52a point at their free ends 54a, 56a in directions facing away from one another. In addition, the wind deflector fastening elements 50a, 52a form two channel walls 58a, 60a which bear against the longitudinal guide channel 18a on a side facing away from the wiper strip. The wind deflector fastening elements 50a, 52a are barb-shaped in design in the region of their free ends 54a, 56a. The ends 54a, 56a are enclosed by the wind deflector element 14a in a mounted state.

To guide the spring element 20a, side walls 66a, 68a of the longitudinal guide channel 18c bear against the channel walls 58a, 60a. The channel walls 58a, 60a thereby enclose a right angle with the side walls 66a, 68a. In addition, a partition wall 70a is arranged at the side walls 66a, 68a, which closes the longitudinal guide channel 18a in the direction of the wiper strip 16a. The side walls 66a, 68a extend from the partition wall 70a in a direction facing away from the wiper strip 16a. The retaining element 10a has a longitudinal opening 72a, which opens the longitudinal guide channel 16a towards the wind deflector element 14a.

Two L-shaped guide profiles 74a, 76a of the retaining element 10a are arranged on the partition wall 70a. The guide profiles 74a, 76a are formed integrally with the retaining element 10a. The guide profiles 74a, 76a each have a lateral guide 78a, 80a and a vertical guide 82a, 84a. The vertical guides 82a, 84a each enclose an angle of 90° with the lateral guides 78a, 80a. The lateral guides 78a, 80a each enclose an angle of 90° relative to the partition wall 70a. The guide profiles 74a, 76a point at their ends free of the vertical guides 82a, 84a in directions facing one another. The guide profiles 74a, 76a and the partition wall 70a form a welt track 86a, into which the wiper strip 16a is inserted in a mounted state.

The retaining element 10a is produced integrally from polyethylene by an extrusion process. A person skilled in the art will consider different plastics which seem appropriate in this context, such as polypropylene, polyamide, polyvinyl chloride, polycarbonate and/or polystyrene in particular.

Figure 3:
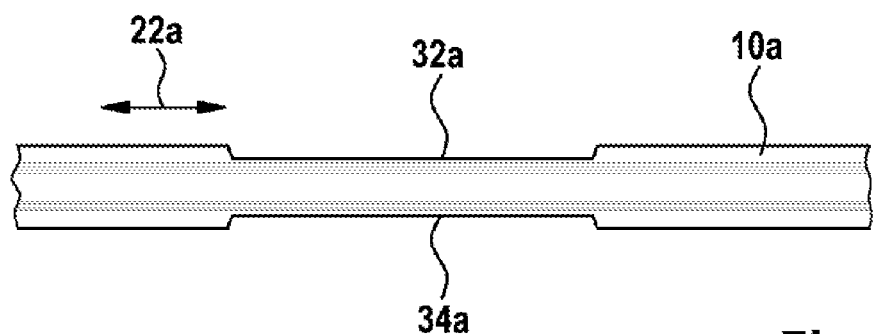
FIG. 3 shows a top view of the retaining element according to FIG. 1.

FIG. 3 shows a top view of the retaining element 10a. The retaining element 10a has two fastening recesses 32a, 34a, which are provided to receive the wiper blade adapter 12a in an interlocking manner. The fastening recesses 32a, 34a are arranged in side walls 66a, 68a, which laterally delimit a longitudinal guide channel 18a.

Figure 4:
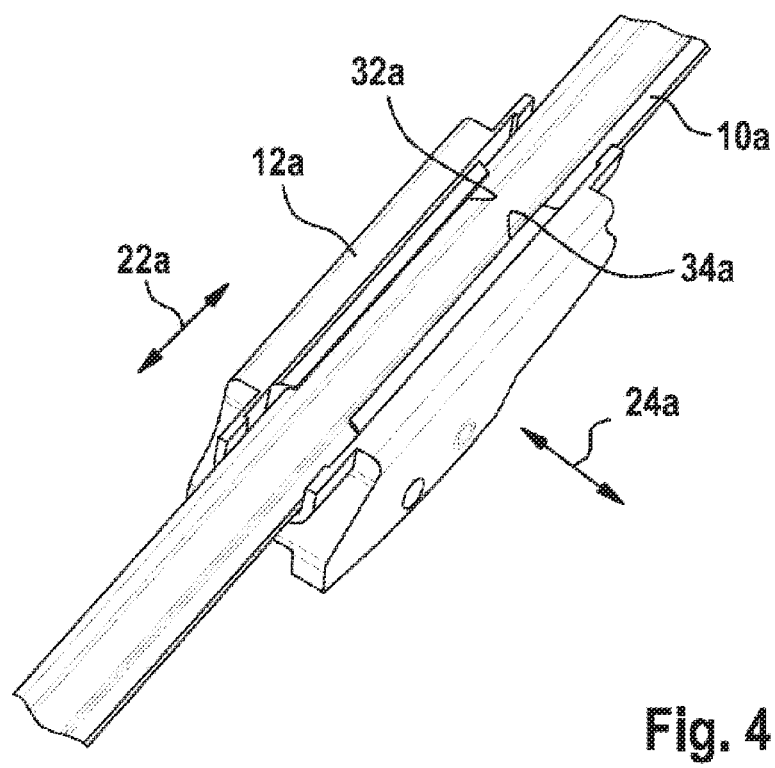
FIG. 4 shows a further perspective view of the wiper blade adapter and the retaining element according to FIG. 1.

In one assembly, the wiper blade adapter 12a is initially positioned on the retaining element 10a in a vertical direction (FIG. 4). The vertical direction 44a extends perpendicularly to the longitudinal direction 22a and perpendicularly to a wiping direction 24a. The vertical direction 44a is therefore perpendicular to a wiping surface (not shown) in an operating state.

Figure 5:
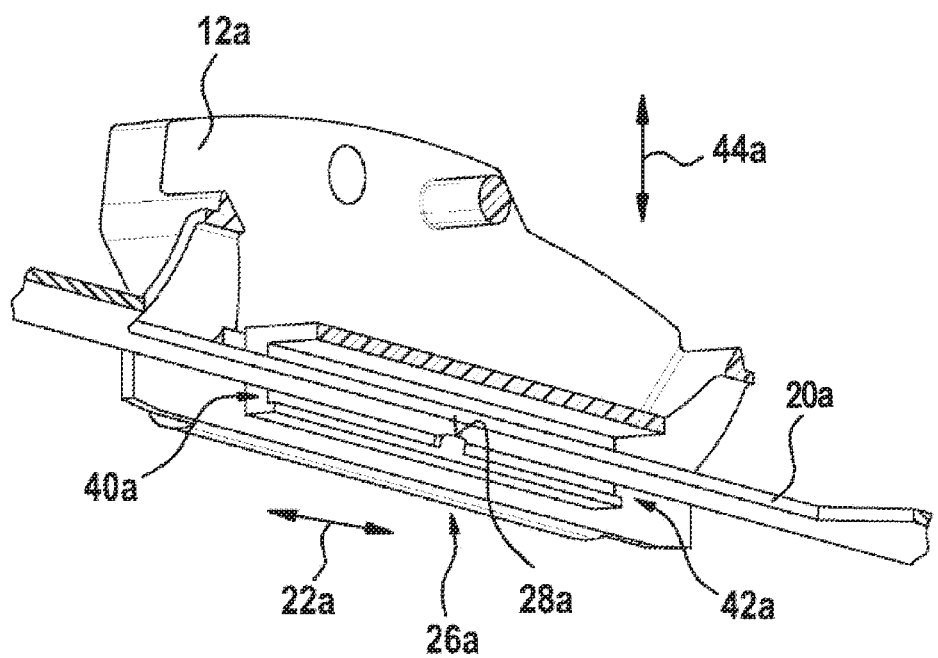
FIG. 5 shows a perspective view of a section through the wiper blade adapter according to FIG. 1 and through a spring element.

The wiper blade adapter 12a comprises a pivot bearing 26a which pivotably supports the spring element 20a (FIG. 5). The pivot bearing 26a has a punctiform bearing surface 28a, which supports the spring element 20a in a mounted state. The wiper blade adapter 12a further comprises a free space 40a, 42a, which spaces the spring element 20a apart over a large part of a longitudinal extension of the wiper blade adapter 12a from said wiper blade adapter in the vertical direction 44a. The bearing surface 28a is arranged centrally in the wiper blade adapter 12a, viewed in a longitudinal direction 22a. A further identical pivot bearing is arranged symmetrically to the sectional plane for the pivot bearing 26a, but is not shown for the sake of clarity.

The fastening recesses 32a, 34a extend in a mounted state in the area of the free space 40a, 42a and of the pivot bearing 26a.

The retaining element 10a can thereby be deflected within the wiper blade adapter 12a in a vertical direction 44a. A movement of the wiper blade adapter 12a relative to the retaining element 10a in a longitudinal direction 22a and in the wiping direction 24a is, however, avoided.

Figure 6:
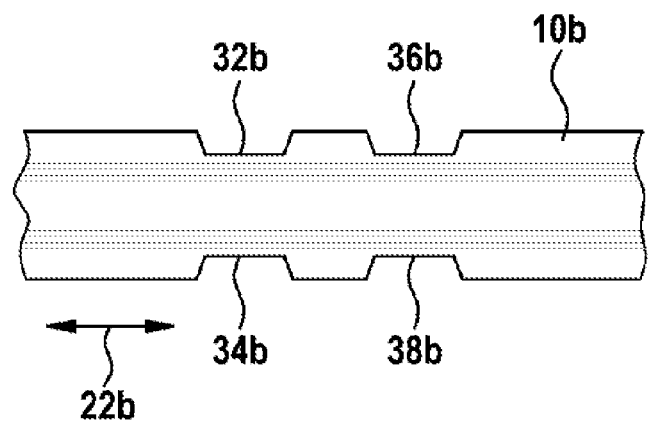
FIG. 6 shows a top view of a retaining element of a further exemplary embodiment of a wiper device according to the invention.
Figure 7:
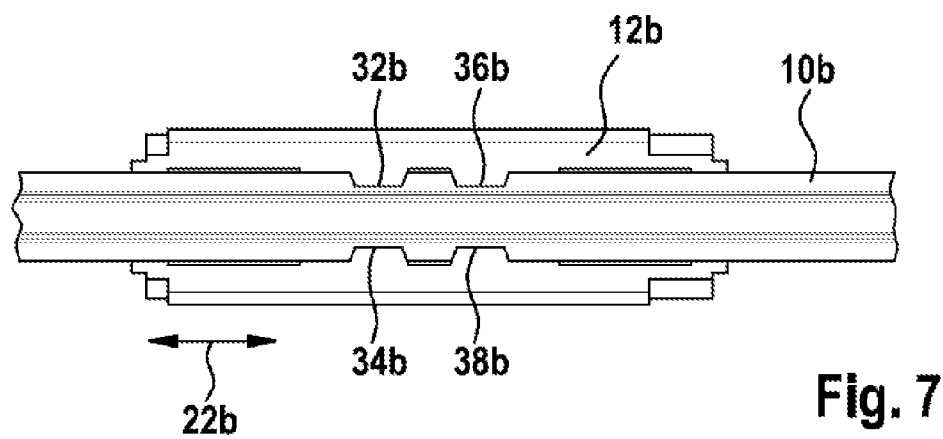
FIG. 7 shows a bottom view of the retaining element according to FIG. 6 with a wiper blade adapter and FIG. 8 shows a sectional view of a spring element and the wiper blade adapter according to FIG. 7.
Figure 8:
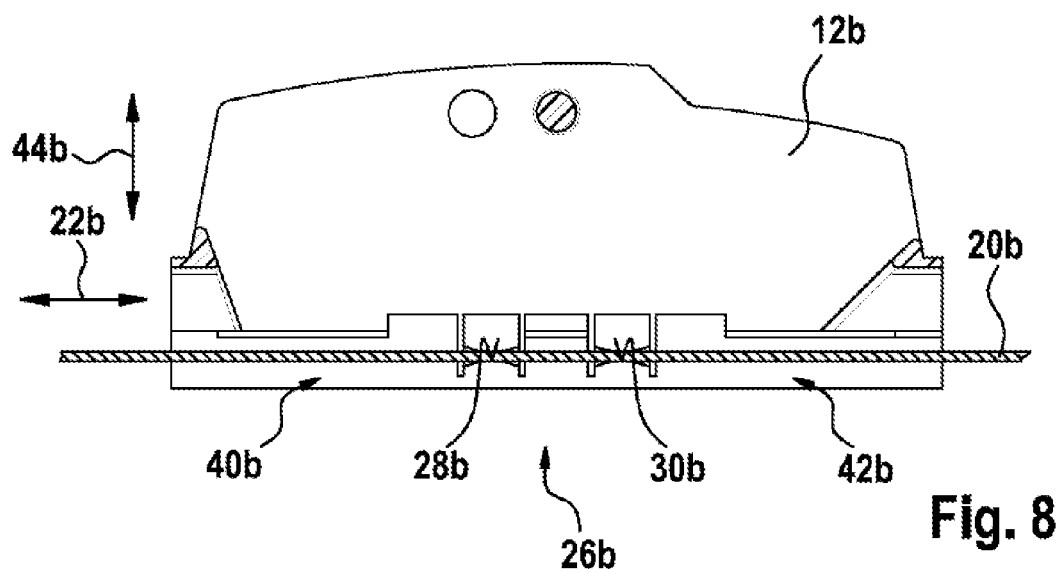

A further exemplary embodiment of the invention is shown in FIGS. 6 to 8. The following descriptions are substantially limited to the differences between the exemplary embodiments, wherein reference can be made to the description of the first exemplary embodiment in relation to unchanging components, features and functions. To distinguish between the exemplary embodiments, letter a in the reference numbers in the exemplary embodiment in FIGS. 1 to 5 is replaced with the letter b in the reference numbers in the exemplary embodiment in FIGS. 6 to 8. In relation to components with the same name, particularly in relation to components with the same reference number, reference can also be made in principle to the drawings and/or the description of the first exemplary embodiment.

FIG. 6 shows a retaining element 10b of a further exemplary embodiment of a wiper device. A configuration of the retaining element 10b corresponds in cross-section to the retaining element 10a shown in FIG. 2. The retaining element 10b has four fastening recesses 32b, 34b, 36b, 38b which are arranged in side walls 66b, 68b. Two of the fastening recesses 32b, 36b, or 34b, 38b are arranged in each side wall 66b, 68b. The fastening recesses 32b, 34b, 36b, 38b have a trapezoidal outline.

A first assembly stage of the wiper device is shown in FIG. 7. A wiper blade adapter 12b is positioned on the retaining element 10b and engages with the fastening recesses 32b, 34b, 36b, 38b in an interlocking manner. A movement of the wiper blade adapter 12b relative to the retaining element 10b in the longitudinal direction 22b and in the wiping direction 24b is avoided. A spring element 20b is subsequently inserted into the retaining element 10b. The wiper blade adapter 12b comprises a pivot bearing 26b. The spring element 20b is supported in this case by a first and a second linear bearing surface 28b, 30b of the pivot bearing 26b of the wiper blade adapter 12b (FIG. 8). For the sake of clarity, the retaining element 10b is not shown in FIG. 8. The wiper blade adapter 12b comprises a free space 40b, 42b, which spaces the spring element 20b over a large part of a longitudinal extension of the wiper blade adapter 12b from said wiper blade adapter in a vertical direction 44b. The spring element 20b can thereby be deflected within the wiper blade adapter 12b in a vertical direction 44b. A further, identical pivot bearing is arranged symmetrically to the sectional plane for the pivot bearing 26b, but is not shown for the sake of clarity.

What is claimed is:

1. A wiper device, having a wiper blade adapter (12a; 12b), characterized in that the wiper blade adapter (12a; 12b) comprises a pivot bearing (26a; 26b) which is provided to pivotably support a spring element (20a; 20b) such that the spring element is pivotable relative to the adapter, wherein the pivot bearing (26a; 26b) has at least one punctiform and/or linear bearing surface (28a; 28b; 30b), which is provided to support the spring element (20a; 20b) in a mounted state, and wherein the at least one bearing surface (28a; 28b; 30b) is arranged centrally on the wiper blade adapter (12a) along a longitudinal direction (22a), wherein the wiper device further includes a retaining element (10a, 10b) which is provided to connect the spring element (20a, 20b) to a wiper strip (16a) and to a wind deflector element (14a) in a mounted state, wherein the retaining element (10a, 10b) has at least one fastening recess (32a, 32b, 34a, 34b, 36b, 38b) which is provided to receive the wiper blade adapter (12a, 12b) in an interlocking manner in a mounted state.

2. The wiper device as claimed in claim 1, characterized in that the wiper blade adapter (12a; 12b) comprises at least one free space (40a; 40b, 42a; 42b) which is provided to space the spring element (20a; 20b) at least over a large part of a longitudinal extension of the wiper blade adapter (12a; 12b) from said wiper blade adapter in a vertical direction (44a; 44b).

3. The wiper device as claimed in claim 1, characterized in that the pivot bearing (26b) exhibits at least a first and a second punctiform and/or linear bearing surface (28b, 30b), which is provided to support the spring element (20b) in a mounted state.

4. A wiper blade with a wiper blade adapter (12a; 12b) as claimed in claim 1 and also with a spring element (20a; 20b), a wind deflector element (14a), a retaining element (10a; 10b), and a wiper strip (16a).

5. The wiper device as claimed in claim 1, further comprising a spring element pivotably supported by the pivot bearing.

6. The wiper device as claimed in claim 5, characterized in that the wiper blade adapter (12a; 12b) comprises at least one free space (40a; 40b, 42a; 42b) which is provided to space the spring element (20a; 20b) at least over a large part of a longitudinal extension of the wiper blade adapter (12a; 12b) from said wiper blade adapter in a vertical direction (44a; 44b).

7. The wiper device as claimed in claim 6, characterized in that the pivot bearing (26b) exhibits at least a first and a second punctiform and/or linear bearing surface (28b, 30b), which is provided to support the spring element (20b) in a mounted state.

8. The wiper device as claimed in claim 5, characterized by the retaining element (10a; 10b) connecting the spring element (20a; 20b) to a wiper strip (16a) and to a wind deflector element (14a) in a mounted state.

9. The wiper device as claimed in claim 5, further comprising a wind deflector element (14a), wherein the at least one bearing surface (28a; 28b; 30a) extends upwardly along a vertical direction (44a; 44b) toward the wind deflector element (14a), such that the spring element (10a; 20b) is disposed between the at least one bearing surface (28a; 28b; 30a) and the wind deflector element (14a).

10. The wiper device as claimed in claim 5, wherein the at least one bearing surface (28a; 28b; 30a) is only a single bearing surface (28a).

11. The wiper device with a wiper blade adapter (12a; 12b) as claimed in claim 1 and also with a wind deflector element (14a) and a wiper strip (16a).

12. The wiper device as claimed in claim 1, further comprising a wind deflector element (14a), wherein the at least one bearing surface (28a; 28b; 30a) extends upwardly along a vertical direction (44a; 44b) toward the wind deflector element (14a).

13. The wiper device as claimed in claim 1, wherein the at least one bearing surface (28a; 28b; 30a) is only a single bearing surface (28a).

* * * * *